United States Patent
Beer

(10) Patent No.: US 9,352,502 B2
(45) Date of Patent: May 31, 2016

(54) POROUS MEDIA HEAT TRANSFER FOR INJECTION MOLDING

(71) Applicant: LAWRENCE LIVERMORE NATIONAL SECURITY, LLC, Livermore, CA (US)

(72) Inventor: Neil Reginald Beer, Pleasanton, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 23 days.

(21) Appl. No.: 14/313,790

(22) Filed: Jun. 24, 2014

(65) Prior Publication Data

US 2014/0374936 A1    Dec. 25, 2014

Related U.S. Application Data

(60) Provisional application No. 61/839,244, filed on Jun. 25, 2013.

(51) Int. Cl.
*B29C 45/73*    (2006.01)
*B29C 33/38*    (2006.01)

(52) U.S. Cl.
CPC ......... *B29C 45/7331* (2013.01); *B29C 45/7312* (2013.01); *B29C 33/3814* (2013.01)

(58) Field of Classification Search
CPC .................................................. B29C 33/3814
See application file for complete search history.

(56) References Cited

U.S. PATENT DOCUMENTS

| | | | | |
|---|---|---|---|---|
| 2,510,907 A * | 6/1950 | Renaud | ..................... | B22C 9/06 164/338.1 |
| 3,635,037 A | 1/1972 | Hubert | | |
| 3,932,096 A * | 1/1976 | Kartman | ................. | B29C 33/04 249/79 |
| 4,091,069 A * | 5/1978 | Allen | ..................... | B29C 45/34 249/79 |
| 4,622,001 A | 11/1986 | Bright et al. | | |
| 4,781,569 A * | 11/1988 | Kinugasa | ............ | B29C 33/3814 156/245 |
| 4,934,918 A | 6/1990 | Outland | | |
| 5,055,025 A * | 10/1991 | Muller | .................... | B29C 45/73 425/144 |
| 5,423,670 A * | 6/1995 | Hamel | ................ | B29C 45/2737 264/40.6 |
| 5,460,761 A * | 10/1995 | Larsson | ................ | B29C 33/046 249/79 |
| 5,516,470 A * | 5/1996 | Larsson | ................ | B29C 33/046 249/79 |
| 5,832,981 A * | 11/1998 | McDonald | ............. | B22C 7/023 164/131 |

(Continued)

FOREIGN PATENT DOCUMENTS

WO    WO 2008/070198 A2    6/2008

OTHER PUBLICATIONS

Beer, R. et al., "On-Chip Single-Copy Real-Time Reverse-Transcription PCR in Isolated Picoliter Droplets," *Anal. Chem.*, 2008, pp. 1854-1858, vol. 80.

(Continued)

*Primary Examiner* — Jill Heitbrink
(74) *Attorney, Agent, or Firm* — Fenwick & West, LLP

(57) ABSTRACT

The cooling of injection molded plastic is targeted. Coolant flows into a porous medium disposed within an injection molding component via a porous medium inlet. The porous medium is thermally coupled to a mold cavity configured to receive injected liquid plastic. The porous medium beneficially allows for an increased rate of heat transfer from the injected liquid plastic to the coolant and provides additional structural support over a hollow cooling well. When the temperature of the injected liquid plastic falls below a solidifying temperature threshold, the molded component is ejected and collected.

20 Claims, 6 Drawing Sheets

(56) References Cited

U.S. PATENT DOCUMENTS

| | | | |
|---|---|---|---|
| 5,989,492 A * | 11/1999 | Larsson | B22F 3/22 |
| | | | 264/328.2 |
| 6,112,804 A * | 9/2000 | Sachs | B22C 9/065 |
| | | | 164/348 |
| 7,133,726 B1 | 11/2006 | Atwood et al. | |
| 7,354,389 B2 | 4/2008 | Kureshy et al. | |
| 7,410,618 B2 | 8/2008 | Muser et al. | |
| 8,128,397 B2 | 3/2012 | Ciccone et al. | |
| 2005/0252773 A1 | 11/2005 | McBride et al. | |
| 2008/0166793 A1 | 7/2008 | Beer et al. | |
| 2009/0226971 A1 | 9/2009 | Beer et al. | |
| 2009/0226972 A1 | 9/2009 | Beer et al. | |

OTHER PUBLICATIONS

Mahjoob, S. et al., "A synthesis of fluid and thermal transport models for metal foam heat exchangers," *International Journal of Heat and Mass Transfer*, 2008, pp. 3701-3711, vol. 51.

Mahjoob, S. et al., "Rapid Microfluidic Thermal Cycler for Polymerase Chain Reaction DNA Amplification," *International Journal of Heat and Mass Transfer*, 2008, pp. 2109-2122, vol. 51.

Wheeler, E.K. et al., "Under-Three-minute PCR: Probing the Limits of Fast Amplification," *Analyst*, 2011, pp. 3707-3712, vol. 136.

\* cited by examiner

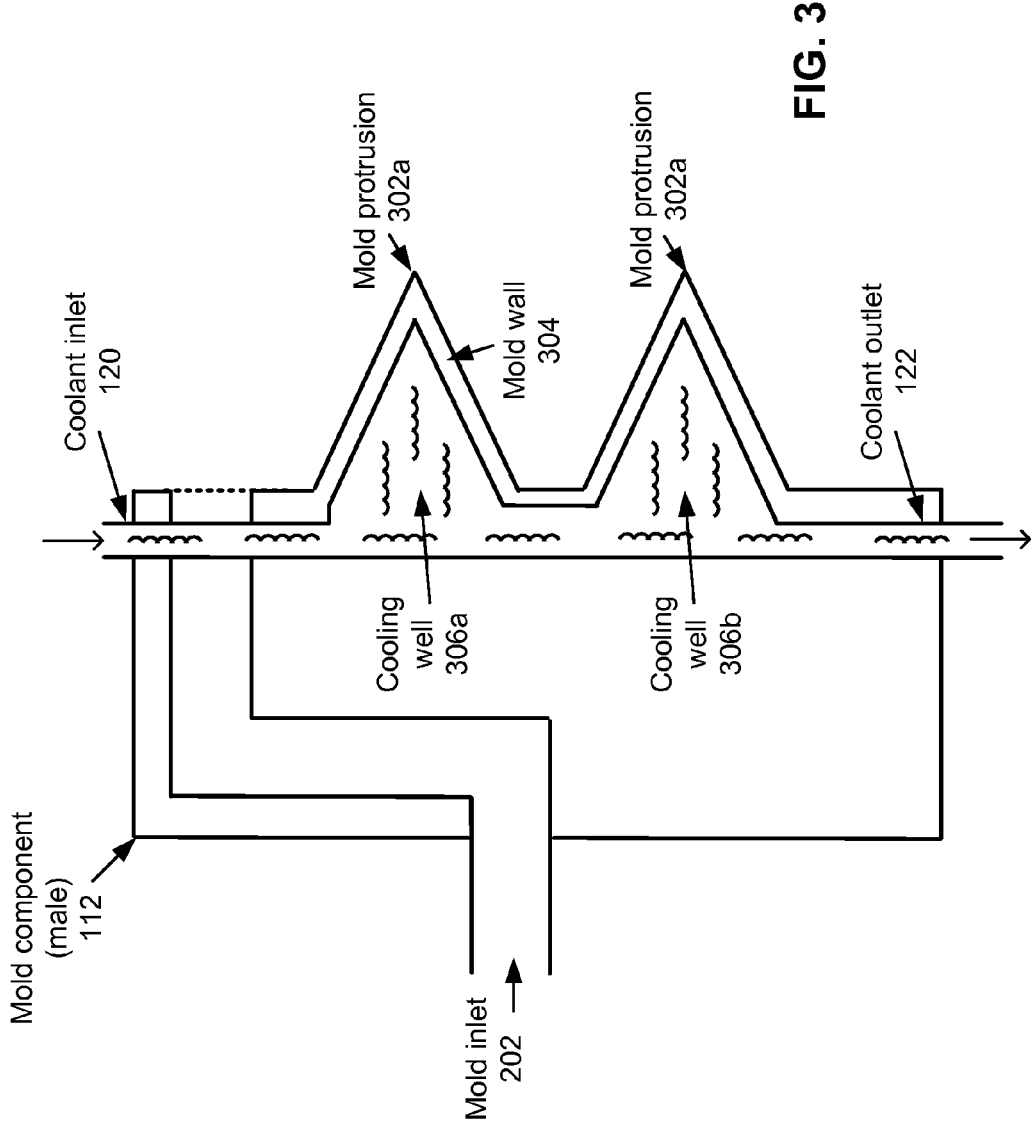

ized to POROUS MEDIA HEAT TRANSFER FOR
INJECTION MOLDING

RELATED APPLICATIONS

This application claims priority to and the benefit of U.S. Provisional Application No. 61/839,244, filed Jun. 25, 2013, the contents of which are incorporated by reference herein in their entirety.

STATEMENT AS TO RIGHTS TO INVENTIONS MADE UNDER FEDERALLY SPONSORED RESEARCH AND DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

This application relates to manufacture via injection molding, and more particularly to the use of porous media to enhance heat transfer in an injection molding cooling system.

BACKGROUND OF THE INVENTION

Injection molding utilizes a ram or screw-type plunger to force molten plastic material into a mold cavity, solidifying the plastic into a shape that has conformed to the contour of the mold. Injection molding is most commonly used to process both thermoplastic and thermosetting polymers, with the former being considerably more prolific in terms of annual material volumes processed. Thermoplastics are prevalent due to characteristics which make them highly suitable for injection molding, such as the ease with which they can be recycled, the versatility allowing thermoplastics to be used in a wide variety of applications, and the ability of the thermoplastics to soften and flow upon heating. Examples of components manufactured using injection molding include disposable razors, plastic toys, medical equipment, auto parts, and the like.

To expedite the solidifying of molten plastic within a mold cavity, a variety of cooling systems can be implemented. For example, coolant fluid can be pumped into an empty cavity thermally coupled to the mold walls. However, such an empty cavity does not provide structural support to the mold itself, increasing the likelihood that the shape of the mold deforms or warps during operation, rendering the mold useless. Cooling rods can be thermally coupled to the mold walls, but heat transfer using thermal rods is less efficient than fluid-based cooling solutions. The faster a set of components can be injected, cooled, and ejected from an injection molding machine, the more components can be made in a given time frame, reducing overall manufacturing time.

SUMMARY OF THE INVENTION

A cooling system for an injection molding device is described herein. The injection molding device includes reciprocal mold components that, when coupled, form one or more mold cavities between the coupled mold components. Molten liquid plastic is injected into the mold cavities, and when the temperature of the injected liquid plastic falls below a solidifying threshold, the resulting solidified mold components are ejected and collected.

To expedite the cooling process, one or more porous mediums are disposed within one or more of the mold components. Each porous medium is thermally coupled to at least one mold cavity. Coolant is pumped into the porous mediums, and thermal energy is transferred from the injected liquid plastic to the coolant via the porous mediums. Coolant can be pumped into the porous mediums via one or more porous medium inlets disposed within the porous mediums. The coolant flows from the porous medium inlets, through the porous mediums, and out of the porous mediums via one or more porous medium outlets. The porous medium inlets can be coupled to a cooling system inlet via a first pipe, and the porous medium outlets can be coupled to a cooling system outlet via second pipe.

Coolant can be pumped from a coolant supply tank storing coolant at a pre-determined cooling temperature below the solidifying temperature with a pump coupled to the coolant supply tank. The pump pumps coolant from the coolant supply tank and into the cooling system inlet. As coolant is pumped from the coolant supply tank and into the porous mediums, coolant within the porous mediums is pumped out of the cooling system outlet and back into the coolant supply tank. The timing and pumping of coolant through the cooling system can be controlled by a controller coupled to the pump, and can be based on the injection of liquid plastic into the mold cavities and the temperature of the injected liquid plastic.

The features and advantages described in the specification are not all inclusive and, in particular, many additional features and advantages will be apparent to one of ordinary skill in the art in view of the drawings and specification. Moreover, it should be noted that the language used in the specification has been principally selected for readability and instructional purposes, and may not have been selected to delineate or circumscribe the inventive subject matter.

BRIEF DESCRIPTION OF THE DRAWINGS

FIG. 3 illustrates an injection molding cooling system, according to one embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Injection Molding and Cooling System Overview

Injection molding utilizes the high-pressure injection of the liquid or fluid raw material (such as a plastic polymer, or "thermoplastics" hereinafter) into a mold to shape the material into the desired shape. Molds can include a single cavity or multiple cavities. In multiple cavity molds, each cavity can be identical to form uniform molded components or can be unique to form different molded components within a single cycle. Molds are generally made from tool steels, but stainless steels and aluminum molds are also suitable for certain applications.

Figure 1:
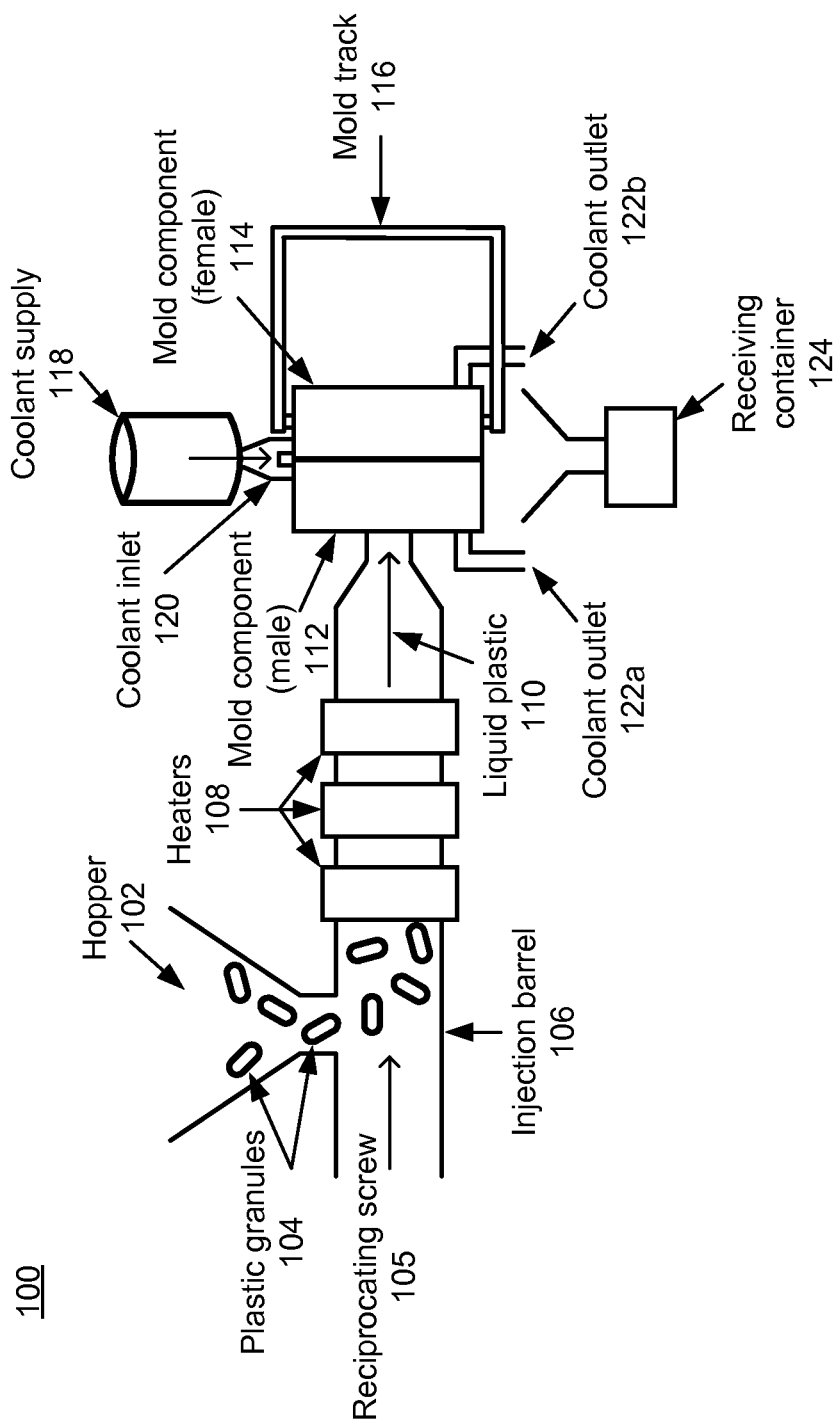
FIG. 1 illustrates an injection molding environment, according to one embodiment.

FIG. 1 illustrates an injection molding environment, according to one embodiment. When thermoplastics are molded, typically pelletized plastic granules 104 are fed through a hopper 102 into an injection barrel 106 by a reciprocating screw 105. The reciprocating screw 105 pressurizes and pushes the plastic granules through the injection barrel 106, where they are heated by one or more heaters 108 into a liquid form. The resulting liquid plastic 110 flows through the injection barrel 106 and into a mold component for molding.

The mold component can include a male mold component 112 and a female mold component 114. The injection barrel 106 is coupled to the mold component, for instance via a check valve (not illustrated in the embodiment of FIG. 1). The mold component includes a mold cavity coupled to the injection barrel, and the liquid plastic 110 forcibly flows into the mold cavity, filling the mold cavity. The injection time required to fill the mold cavity can be less than 1 second.

After the mold cavity is filled with the liquid plastic 110, the check valve can close, separating the filled mold cavity from the injection barrel 106. The liquid plastic 110 within the mold cavity then cools and solidifies, forming a molded component. To expedite the cooling process, a coolant supply 118 can provide a coolant to the mold via a coolant inlet 120. Coolant flows from the coolant supply 118 into the mold via the coolant inlet, cooling the liquid plastic within the mold cavity, and out of the mold via one or more coolant outlets 122 (such as coolant outlet 122a and coolant outlet 122b.

Once the temperature of the plastic within the mold cavity has fallen before a temperature threshold associated with the solidifying temperature of the plastic, the male mold component and the female mold component can decouple, and the molded component can be ejected (for instance, using one or more injection pins) from the mold cavity and down into a receiving container 124 for collection. One or more of the mold components can be coupled to a mold track 116, allowing the mold components to move and decouple. One or more temperature sensors (not illustrated in the embodiment of FIG. 1) can be used to determine if the temperature of the plastic within the mold cavity has fallen below a solidifying temperature threshold. For example, the mold components can decouple and eject the molded component into the receiving container in response to a determination by each of a plurality of temperature sensors that the temperature of the plastic within the mold cavity has fallen below the solidifying temperature threshold.

The male mold component 112 and the female mold component 114 can securely couple using one or more securing pins, locks, valves, latches, or any other suitable securing components. In some embodiments, when the mold components are securely coupled, the mold cavity is air tight. In other embodiments, the mold cavity can include an air valve allowing air to escape when liquid plastic flows into the mold cavity from the injection barrel 106.

Figure 2A:
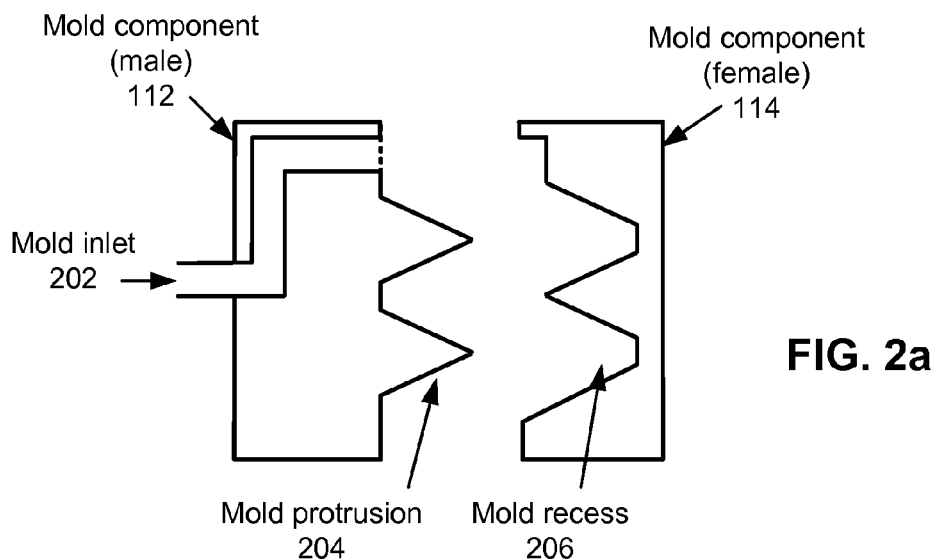
FIG. 2a illustrates decoupled injection molding mold components, according to one embodiment.

FIG. 2a illustrates decoupled injection molding mold components, according to one embodiment. The embodiment of FIG. 2a includes a male mold component 112 uncoupled from a female mold component 114. The male mold component includes one or more mold protrusions 204, and the female mold component includes one or more corresponding mold recesses 206 configured to align with the mold protrusions when the mold components are securely coupled. The male mold component includes a mold inlet 202 configured to allow for the flow of liquid plastic from a source external to and through the male mold component 112.

Figure 2B:
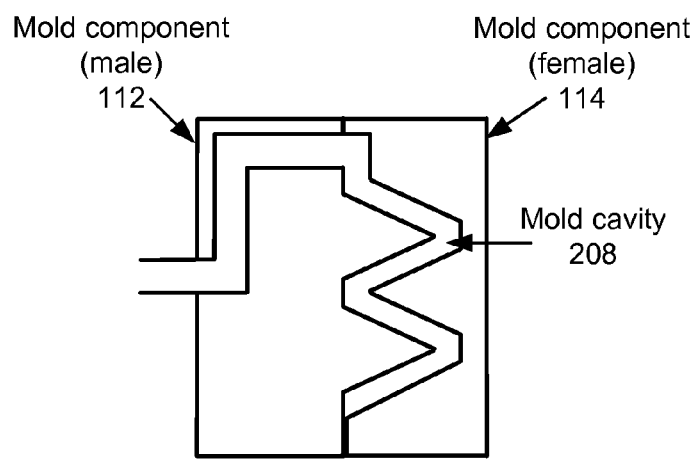
FIG. 2b illustrates securely coupled injection molding mold components, according to one embodiment.

FIG. 2b illustrates securely coupled injection molding mold components, according to one embodiment. In the embodiment of FIG. 2b, the male mold component 112 is securely coupled to the female mold component 114, forming a mold cavity 208 between the corresponding mold protrusions of the male mold component and the mold recesses of the female mold component. The mold cavity 208 is configured in dimensions selected by (for instance) a manufacturer to produce a molded component of a desired shape. In some embodiments, the mold cavity is configured to produce a plurality of molded components. It should be noted that although an "M"-shaped mold cavity is illustrated in the embodiment of FIG. 2b, the mold cavity 208 can be of any shape or shapes as desired by a user of the injection molding environment.

FIG. 3 illustrates an injection molding cooling system, according to one embodiment. In the embodiment of FIG. 3, a male mold component 112 includes a plurality of mold protrusions, mold protrusions 302a and 302b, each including a cooling well, cooling well 306a and 306b, respectively. The outer surface of the mold protrusions 302 are separated from the cooling wells 306 by a mold wall 304. The mold wall 304 can be made of a thermally conductive material, such as steel or any other suitable material.

The male mold component of FIG. 3 includes a coolant inlet 120 configured to receive a coolant (such as water), and a coolant outlet 122. The coolant flows from the coolant inlet 120, through the cooling wells 306, and out of the coolant outlet 122. The coolant can be pumped into the male mold component 112, for instance in response to a determination that the liquid plastic within the mold cavity requires cooling. Upon entering the coolant inlet 120, the coolant can be configured to reduce the temperature of the mold wall 304 by absorbing heat from the mold wall (and accordingly, from the liquid plastic). Accordingly, the temperature of the coolant flowing out of the coolant outlet 122 is higher than the temperature of the coolant flowing into the coolant inlet 120 after absorbing heat from the mold wall 304.

Porous Medium-Based Injection Molding Cooling System

To aid in the cooling of molten plastic injected into a mold cavity, a porous medium can be used within a cooling well thermally coupled to a mold wall. As used herein, a porous medium refers to any solid material with cavities or pathways within the material to allow fluid to flow through the medium. One example of a porous medium is a hardened foam. A porous medium may be of uniform porosity and permeability. Alternatively, a porous medium may be of a gradient porosity. In one embodiment, the permeability and the porosity of a porous medium are approximately $3.74 \times 10^{-10}$ m$^2$ and 0.45, respectively. In one embodiment, the porosity of the porous medium is between 0.2 to 0.7. The relative density of the porous medium may be between 10% and 30%. As used herein, "relative density" refers to the volume of a solid material within a porous media relative to the total volume of the porous media.

In order to maximize heat exchange, the porous medium may be composed of a highly thermally conductive material. For example, the porous medium may be composed of copper foam, gold or gold-deposited foam, any metallic or otherwise thermally-conductive foam, metallic composites with isotropic or anisotropic properties, micro-machined or photolithographically-produced microchannel inserts, and doped ceramics. The structure of the porous medium may also include pillars extending from the top, bottom and sides of the porous medium, in either a structured order or randomly. The properties (such as the conduction rates and gradients) of the porous medium can be selected for homogenous heat transfer across the heat exchanger. In one embodiment, the porous medium may be produced by 3-dimensional printing technologies.

The varying cross sectional shape of the structure of a porous medium causes the turbulent flow of fluid pumped into the porous medium, increasing the rate of heat transfer between the fluid and the porous medium (and relatedly, any mediums coupled to the porous medium). Heat transfer (and accordingly, cooling times) can be improved by as much as 300% or more between fluid within the porous medium and the porous medium itself as compared to the heat transfer between a fluid flushed through an empty cavity and walls of the cavity. In addition to the benefit of increased heat transfer, the structure of a porous medium can provide increased structural support within a cooling cavity (a cavity thermally coupled to a medium to be cooled) compared to an empty cavity.

Figure 4:
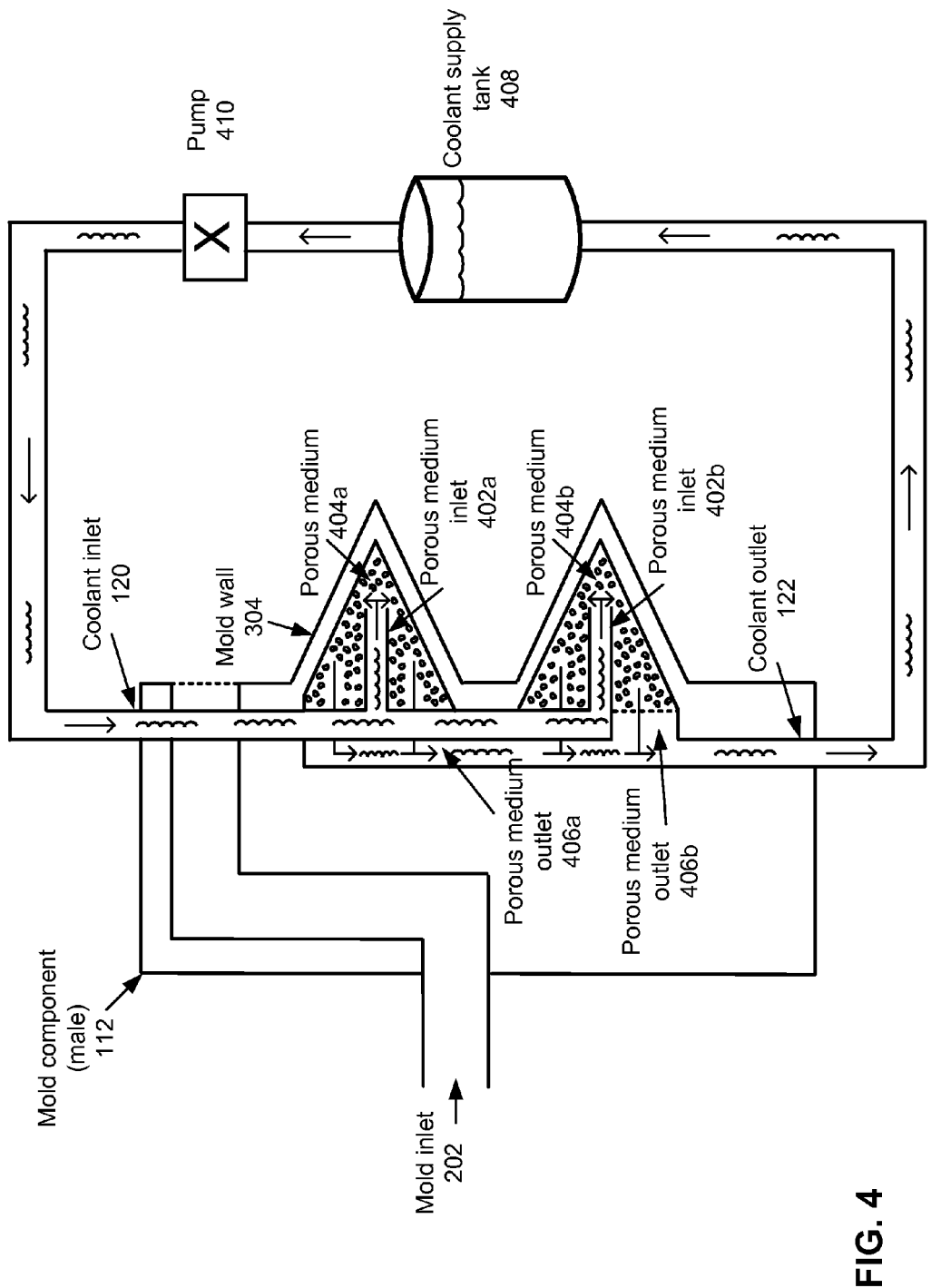
FIG. 4 illustrates a porous medium within an injection molding coolant system, according to one embodiment.

FIG. 4 illustrates a porous medium within an injection molding coolant system, according to one embodiment. The embodiment of FIG. 4 illustrates a cooling system within a male mold component 112, though it should be noted that such a cooling system can be implemented within a female mold component or any other injection molding component according to the principles described herein.

The male mold component 112 includes a porous medium 404a within a first cooling well, and includes a porous medium 404b within a second cooling well. It should be noted that although the male mold component 112 of FIG. 4 includes two cooling wells, each filled with a porous medium 404, in other embodiments, mold components can include any number of cooling wells within any number of porous mediums. In addition, in the embodiment of FIG. 4, the cooling wells are separated from a mold cavity (formed when the male mold component 112 is coupled to a reciprocal female mold component) by a mold wall 304 (which thermally couples the mold cavity to the porous mediums within the cooling wells).

The male mold component 112 includes a mold inlet 202, a coolant inlet 120 and a coolant outlet 122. The coolant inlet 120 is coupled to a pump 410, which is coupled to a coolant supply tank 408, which in turn is coupled to the coolant outlet 122. Coolant is pumped from the coolant supply tank 408 by and through the pump 410 and into the male mold component 112 via the coolant inlet 120. Coolant in turn flows out of the male mold component 112 via the coolant outlet 122 and into the coolant supply tank 408. It should be noted that in some embodiments, a pump (not illustrated in the embodiment of FIG. 4) can pump coolant from the male mold component 112 through the coolant outlet 122 and into the coolant supply tank 408.

Coolant pumped into the male mold component 112 via the coolant inlet 120 flows into the porous mediums 404a and 404b via porous medium inlets 402a and 402b. The porous medium inlets 402 are coupled to the coolant inlet 120 such that coolant flowing through the coolant inlet 120 into the male mold component 112 flows out of the porous medium inlets 402 and into the porous mediums 404. In some embodiments, the porous medium inlets 402 are located within the porous mediums 404 such that the porous mediums 404 partially or completely surround the porous medium inlets 402. In other words, each porous medium inlet 402 is located within the porous medium 404 such that the porous medium inlet is not in direct contact with the mold wall 304. In some embodiments (such as the embodiment of FIG. 4), the porous medium inlets 402 include a length of pipe and extend into the porous medium 404 such that the pipe walls of at least a portion of the length of pipe is surrounded by the porous medium.

Coolant pumped into each porous medium 404 via a corresponding porous medium inlet 402 flows from the porous medium inlet, through and out of the porous medium via one or more porous medium outlets (such as the porous medium outlets 406a and 406b), and out of the male mold component 112 via the coolant outlet 122. The coolant flows through the porous mediums 404, allowing for the transfer of thermal energy from liquid plastic pumped into a mold cavity, through the mold wall 304, and to the coolant within the porous mediums 404. As described above, the porous mediums 404 allow for the cooling of molded components due to the transfer of thermal energy from the molded component to coolant within the porous mediums at a faster rate than hollow cooling wells.

In some embodiments, coolant is pumped from the coolant supply tank 408, into the male mold component 112, through the male mold component, and out of the male mold component to the coolant supply tank via piping, tubing, or any other coupling medium configured to allow for the transfer of coolant ("pipe" or "piping" hereinafter). In some embodiments, each porous medium inlet 402 within the male mold component 112 is coupled to the coolant inlet 120 via a first pipe. Likewise, in some embodiments, each porous medium outlet 406 is coupled to the coolant outlet 122 via a second pipe.

In some embodiments, the pump 410 can include or be coupled to a coolant system controller (not illustrated in the embodiment of FIG. 4) configured to control the pumping of coolant from the coolant supply tank 408 and into the male mold component 112. For instance, the coolant system controller can determine when liquid plastic is injected within a mold cavity, can pump coolant through the male mold component 112 in response to such a determination, can detect when the temperature of the injected liquid plastic falls below a solidifying threshold, and can stop pumping coolant into the male mold component in response to such a determination. In some embodiments, the coolant system controller can control the injection of liquid plastic into the mold cavity, the coupling and decoupling of mold components, and any other functionality associated with the operation of an injection molding system. In alternative embodiments, an external injection molding system controller controls such functionalities, and is communicatively coupled to the coolant system controller, for instance communicating to the coolant system controller when liquid plastic is injected into the mold cavity. The coolant system controller can be communicatively coupled to one or more thermal sensors coupled to the mold cavity or mold wall 304 and configured to provide the temperature of injected liquid plastic to the coolant system controller.

The coolant supply thank 408 is configured to maintain the temperature of coolant within the tank, for instance by reducing the temperature of coolant flowing out of the coolant outlet 122 and into the coolant supply tank 408 to a predetermined temperature threshold. It should be noted that although the coolant supply tank 408 and the pump 410 are coupled to one mold component in the embodiment of FIG. 4, in practice, the coolant supply tank 408 can provide coolant to any number of mold components using one or more pumps. For example, the coolant supply tank 408 can provide coolant to a first mold component (such as a male mold component) and a second mold component (such as a female mold component) when the first and second mold components are coupled to form a mold cavity and liquid plastic is injected within the mold cavity.

Figure 5:
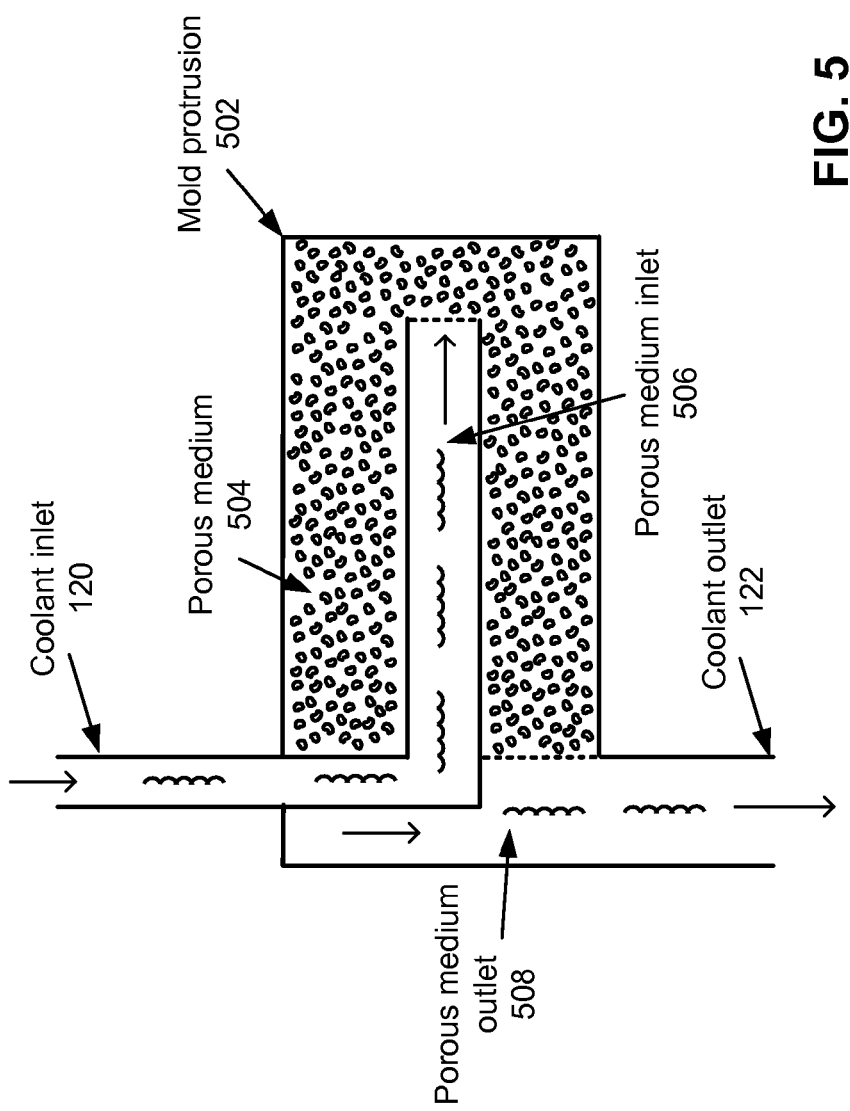
FIG. 5 illustrates a porous medium within a mold component, according to one embodiment.

FIG. 5 illustrates a porous medium within a mold component, according to one embodiment. Coolant flows from a coolant inlet 120 and into a porous medium 504 via a porous medium inlet 506. Likewise, coolant flows out of the porous medium 504 and through a coolant outlet 122 via a porous medium outlet 508. Although only one mold protrusion is illustrated in the embodiment of FIG. 5, in practice, any number of mold protrusions can be implemented within a mold component.

In the embodiment of FIG. 5, a mold protrusion 502 within a mold component includes an impermeable outer surface and an internal porous medium 504 filling the mold protrusion from a porous medium inlet to the impermeable outer surface. As the porous medium provides structural support within the mold protrusion 502, the mold protrusion does not need a separate and additional mold wall (such as the mold wall 304 of FIG. 4) to provide structural support (though it should be appreciated that the impermeable outer surface of the mold protrusion 502 has some necessary thickness). In addition to providing structural support within the mold protrusion 502, the absence of a mold wall can beneficially increase the transfer of thermal energy from a liquid plastic injected within a mold cavity to the coolant within the porous medium 504.

It should be noted that the mold protrusion 502 of FIG. 5 can be implemented within any mold component, such as the male mold component 112 of the embodiment of FIG. 4. Further, it should be noted that the shape of any mold protrusion and mold component illustrated herein is for the purposes of illustration only. The porous medium-based coolant system described herein can be implemented within mold protrusions and mold components of any shape or size accordingly to the principles described herein.

Figure 6:
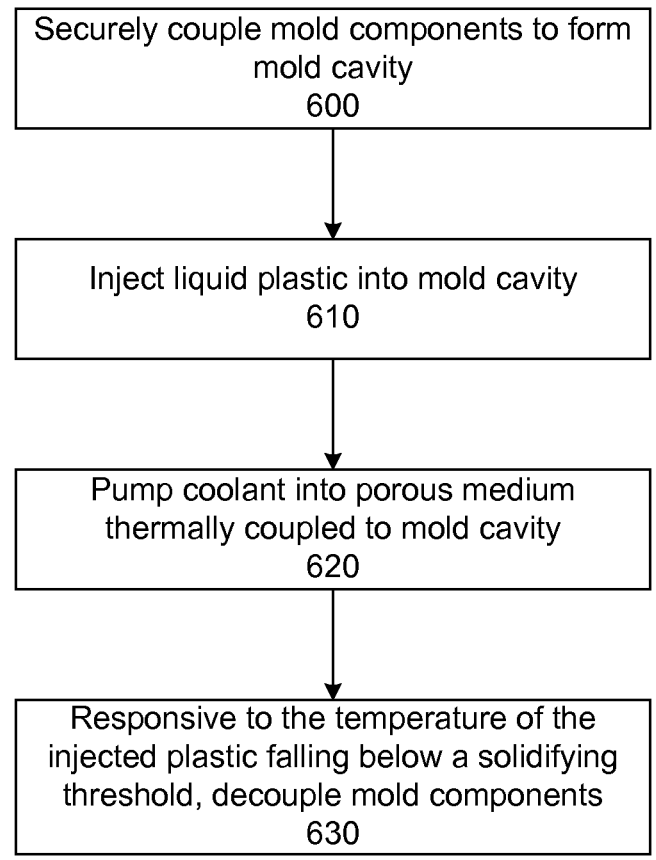
FIG. 6 is a flow chart illustrating a process for cooling molded plastic in an injection molding environment, according to one embodiment.

FIG. 6 is a flow chart illustrating a process for cooling molded plastic in an injection molding environment, according to one embodiment. Mold components are securely coupled 600, forming a mold cavity between the mold components. Liquid plastic is injected 610 into the mold cavity. Coolant is pumped 620 into a porous medium thermally coupled to the mold cavity, such as a porous medium within a mold component protrusion. Thermal energy is transferred from the injected plastic to the coolant within the porous medium. Responsive to the temperature of the injected plastic falling below a solidifying threshold, the mold components are decoupled 630.

Additional Considerations

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

In addition, the language used in the specification has been principally selected for readability and instructional purposes, and may not have been selected to delineate or circumscribe the inventive subject matter. Accordingly, the disclosure is intended to be illustrative, but not limiting, of the scope of the embodiments.

While particular embodiments and applications have been illustrated and described herein, it is to be understood that the embodiment is not limited to the precise construction and components disclosed herein and that various modifications, changes, and variations may be made in the arrangement, operation, and details of the methods and apparatuses without departing from the spirit and scope.

What is claimed is:

1. A cooling system for an injection molding device, comprising:
   a cooling system inlet configured to receive coolant pumped into the cooling system inlet;
   a cooling system outlet configured to provide coolant pumped out of the cooling system outlet;
   a porous medium disposed within an injection molding device component, the injection molding device component comprising a mold wall and thermally coupled to a mold cavity formed when the injection molding device component is coupled to a reciprocal injection molding device component and configured to receive injected liquid plastic, the porous medium thermally coupled to the mold cavity via the mold wall;
   a porous medium inlet coupled to the cooling system inlet and the porous medium, the porous medium inlet configured to allow coolant to flow from the cooling system inlet and into the porous medium via the porous medium inlet; and
   a porous medium outlet coupled to the cooling system outlet, the porous medium outlet configured to allow coolant to flow from the porous medium and out of the cooling system outlet via the porous medium outlet, the porous medium inlet extending into the porous medium through a boundary between the porous medium outlet and the porous medium.

2. The cooling system of claim 1, further comprising:
   a coolant supply tank configured to maintain coolant within the coolant supply tank at or below a pre-determined threshold temperature, the coolant supply tank coupled to the cooling system outlet; and
   a pump coupled to the coolant supply tank and the cooling system inlet and configured to pump coolant from the coolant supply tank into the cooling system inlet.

3. The cooling system of claim 2, further comprising:
   a controller communicatively coupled to the pump and configured to cause the pump to pump coolant from coolant supply tank and into the cooling system inlet in response to the injection of liquid plastic into the mold cavity and until the temperature of the injected liquid plastic falls below a solidifying threshold.

4. The cooling system of claim 3, further comprising:
   one or more temperature sensors thermally coupled to the mold wall and to the controller, and configured to provide the temperature of liquid plastic injected within the mold cavity to the controller.

5. The cooling system of claim 1, wherein the porous medium inlet is disposed within the porous medium such that the porous medium inlet is not directly coupled to the mold wall.

6. The cooling system of claim 1, further comprising:
   a second porous medium disposed within the injection molding device component, the second molding device component comprising a second mold wall and thermally coupled to a second mold cavity formed when the injection molding device component is coupled to the reciprocal injection molding device component and configured to receive injected liquid plastic, the second porous medium thermally coupled to the second mold cavity via the second mold wall;
   a second porous medium inlet coupled to the cooling system inlet and the second porous medium, the second porous medium inlet configured to allow coolant to flow from the cooling system inlet and into the second porous medium via the second porous medium inlet; and a second porous medium outlet coupled to the cooling system outlet, the second porous medium outlet configured to allow coolant to flow from the second porous medium and out of the cooling system outlet via the second porous medium outlet.

7. The cooling system of claim 6, wherein the porous medium inlet and the second porous medium inlet are coupled to the cooling system inlet via a first pipe.

8. The cooling system of claim 7, wherein the porous medium outlet and the second porous medium outlet are coupled to the cooling system outlet via a second pipe.

9. A method for cooling in an injection molding device, comprising:
    securely coupling a first mold component and a second mold component to form a mold cavity between the first mold component and the second mold component;
    injecting liquid plastic at a first temperature into the mold cavity;
    pumping coolant into a porous medium within at least one of the first mold component and the second mold component via a porous medium inlet extending into the porous medium through a boundary between the porous medium and a porous medium outlet, the porous medium thermally coupled to the mold cavity such that thermal energy is transferred from the injected liquid plastic to the coolant via the porous medium; and
    responsive to a determination that the temperature of the injected liquid plastic has fallen below a pre-determined second temperature lower than the first temperature, decoupling the mold components.

10. The method of claim 9, wherein pumping coolant into the porous medium comprises:
    operating a pump coupled to the porous medium in response to the injection of liquid plastic into the mold cavity, the pump coupled to the porous medium via the porous medium inlet.

11. The method of claim 10, wherein the pump is coupled to a coolant supply tank configured to provide coolant to the pump for pumping into the porous medium, the coolant supply tank coupled to the porous medium outlet and configured to receive coolant pumped into the porous medium and out of the porous medium outlet.

12. The method of claim 9, wherein the coolant supply tank is configured to maintain coolant stored within the coolant supply tank at a third temperature lower than the second temperature.

13. A cooling system for an injection molding device, comprising:
    a cooling system inlet configured to receive coolant pumped into the cooling system inlet;
    a cooling system outlet configured to provide coolant pumped out of the cooling system outlet;
    an injection molding device component protrusion comprising a porous medium enclosed at least in part by an impermeable protrusion surface, the porous medium thermally coupled to a mold cavity configured to receive injected liquid plastic via the impermeable protrusion surface;
    a porous medium inlet coupled to the cooling system inlet and the porous medium, the porous medium inlet configured to allow coolant to flow from the cooling system inlet and into the porous medium via the porous medium inlet; and
    a porous medium outlet coupled to the cooling system outlet, the porous medium outlet configured to allow coolant to flow from the porous medium and out of the cooling system outlet via the porous medium outlet, the porous medium inlet extending into the porous medium through a boundary between the porous medium outlet and the porous medium.

14. The cooling system of claim 13, further comprising:
    a coolant supply tank configured to maintain coolant within the coolant supply tank at or below a pre-determined threshold temperature, the coolant supply tank coupled to the cooling system outlet; and
    a pump coupled to the coolant supply tank and the cooling system inlet and configured to pump coolant from the coolant supply tank into the cooling system inlet.

15. The cooling system of claim 14, further comprising:
    a controller communicatively coupled to the pump and configured to cause the pump to pump coolant from coolant supply tank and into the cooling system inlet in response to the injection of liquid plastic into the mold cavity and until the temperature of the injected liquid plastic falls below a solidifying threshold.

16. The cooling system of claim 15, further comprising:
    one or more temperature sensors thermally coupled to the impermeable protrusion surface and to the controller, and configured to provide the temperature of liquid plastic injected within the mold cavity to the controller.

17. The cooling system of claim 13, wherein the porous medium inlet is disposed within the porous medium such that the porous medium inlet is not directly coupled to the impermeable protrusion surface.

18. The cooling system of claim 13, further comprising:
    a second injection molding device component protrusion comprising a second porous medium enclosed at least in part by a second impermeable protrusion surface, the second porous medium thermally coupled to a second mold cavity configured to receive injected liquid plastic via the second impermeable protrusion surface;
    a second porous medium inlet coupled to the cooling system inlet and the second porous medium, the second porous medium inlet configured to allow coolant to flow from the cooling system inlet and into the second porous medium via the second porous medium inlet; and
    a second porous medium outlet coupled to the cooling system outlet, the second porous medium outlet configured to allow coolant to flow from the second porous medium and out of the cooling system outlet via the second porous medium outlet.

19. The cooling system of claim 18, wherein the porous medium inlet and the second porous medium inlet are coupled to the cooling system inlet via a first pipe.

20. The cooling system of claim 19, wherein the porous medium outlet and the second porous medium outlet are coupled to the cooling system outlet via a second pipe.

* * * * *